United States Patent [19]
Williamson et al.

[11] Patent Number: 6,082,737
[45] Date of Patent: Jul. 4, 2000

[54] ROTARY SHAFT MONITORING SEAL SYSTEM

[75] Inventors: Guy Gardner Williamson, Framingham, Mass.; Amitava Datta, East Greenwich, R.I.; Luciano Rossi, Bologna, Italy; Jackson Robert Ray Pressley, Albuquerque, N. Mex.

[73] Assignee: John Crane Inc., Morton Grove, Ill.

[21] Appl. No.: 08/915,300

[22] Filed: Aug. 20, 1997

[51] Int. Cl.⁷ .................................................. F16J 15/34
[52] U.S. Cl. ..................... 277/317; 277/318; 277/319; 73/756
[58] Field of Search ................................. 277/317, 318, 277/319, 321; 73/756, 714

[56] References Cited

U.S. PATENT DOCUMENTS

| | | | |
|---|---|---|---|
| 3,297,329 | 1/1967 | Smith et al. | 277/318 |
| 3,700,247 | 10/1972 | Butler et al. | 277/318 |
| 3,914,752 | 10/1975 | Howard et al. . | |
| 3,921,435 | 11/1975 | Howard . | |
| 4,257,747 | 3/1981 | Goldman | 417/63 |
| 4,424,973 | 1/1984 | Heilala | 277/318 |
| 4,497,493 | 2/1985 | Sall et al. | 277/321 |
| 4,498,492 | 2/1985 | Carpentier . | |
| 4,502,842 | 3/1985 | Currier et al. . | |
| 4,515,512 | 5/1985 | Hertell et al. . | |
| 4,558,593 | 12/1985 | Watanabe et al. . | |
| 4,659,235 | 4/1987 | Gilmore, Jr. et al. | 73/714 |
| 4,699,003 | 10/1987 | McNennamy et al. . | |
| 4,732,043 | 3/1988 | Bell et al. | 73/714 |
| 4,737,087 | 4/1988 | Hertell . | |
| 4,781,064 | 11/1988 | Yates . | |
| 4,788,871 | 12/1988 | Nelson et al. . | |
| 4,909,076 | 3/1990 | Busch et al. . | |
| 4,986,127 | 1/1991 | Shimada et al. | 73/714 |
| 5,000,664 | 3/1991 | Lawless et al. . | |
| 5,224,835 | 7/1993 | Oltman | 417/12 |
| 5,235,524 | 8/1993 | Barkhoudarian . | |
| 5,301,553 | 4/1994 | Schultz et al. | 73/714 |
| 5,336,054 | 8/1994 | Seah et al. . | |
| 5,336,996 | 8/1994 | Rusnak . | |
| 5,353,644 | 10/1994 | Frank et al. | 73/714 |
| 5,383,351 | 1/1995 | Kotlyar . | |
| 5,457,640 | 10/1995 | Foller et al. . | |
| 5,487,305 | 1/1996 | Ristic et al. | 73/514.32 |
| 5,490,766 | 2/1996 | Zeck . | |
| 5,493,287 | 2/1996 | Bane . | |
| 5,519,387 | 5/1996 | Besier et al. . | |
| 5,562,406 | 10/1996 | Ooka et al. . | |
| 5,603,608 | 2/1997 | Marz . | |
| 5,755,372 | 5/1998 | Cimbura et al. | 277/318 |
| 5,795,065 | 8/1998 | Barham | 73/714 |

FOREIGN PATENT DOCUMENTS

| | | |
|---|---|---|
| 0 263 664 B1 | 11/1993 | European Pat. Off. . |
| 0 117 695 B1 | 5/1994 | European Pat. Off. . |
| 0559639B1 | 4/1996 | European Pat. Off. . |
| 062101859 | 7/1962 | Netherlands ............. 277/318 |

OTHER PUBLICATIONS

Arbuckle, Don, "Cybernetic Sealing System A New Approach to Seal Support Systems (for Double Mechanical Pump Seals Using a Pressurized Barrier Liquid)", Cyber Seal, Mar. 21, 1997.

*Primary Examiner*—Anthony Knight
*Assistant Examiner*—Mark Williams
*Attorney, Agent, or Firm*—McEachran, Jambor, Keating, Bock & Kurtz

[57] ABSTRACT

A rotary shaft monitoring seal system includes a seal housing; a seal assembly in the housing for sealingly engaging a rotary shaft to prevent fluid leakage between the shaft and the housing; a monitoring port in the housing; and a detector assembly mounted in the port for sensing conditions in the vicinity of the seal assembly.

17 Claims, 4 Drawing Sheets

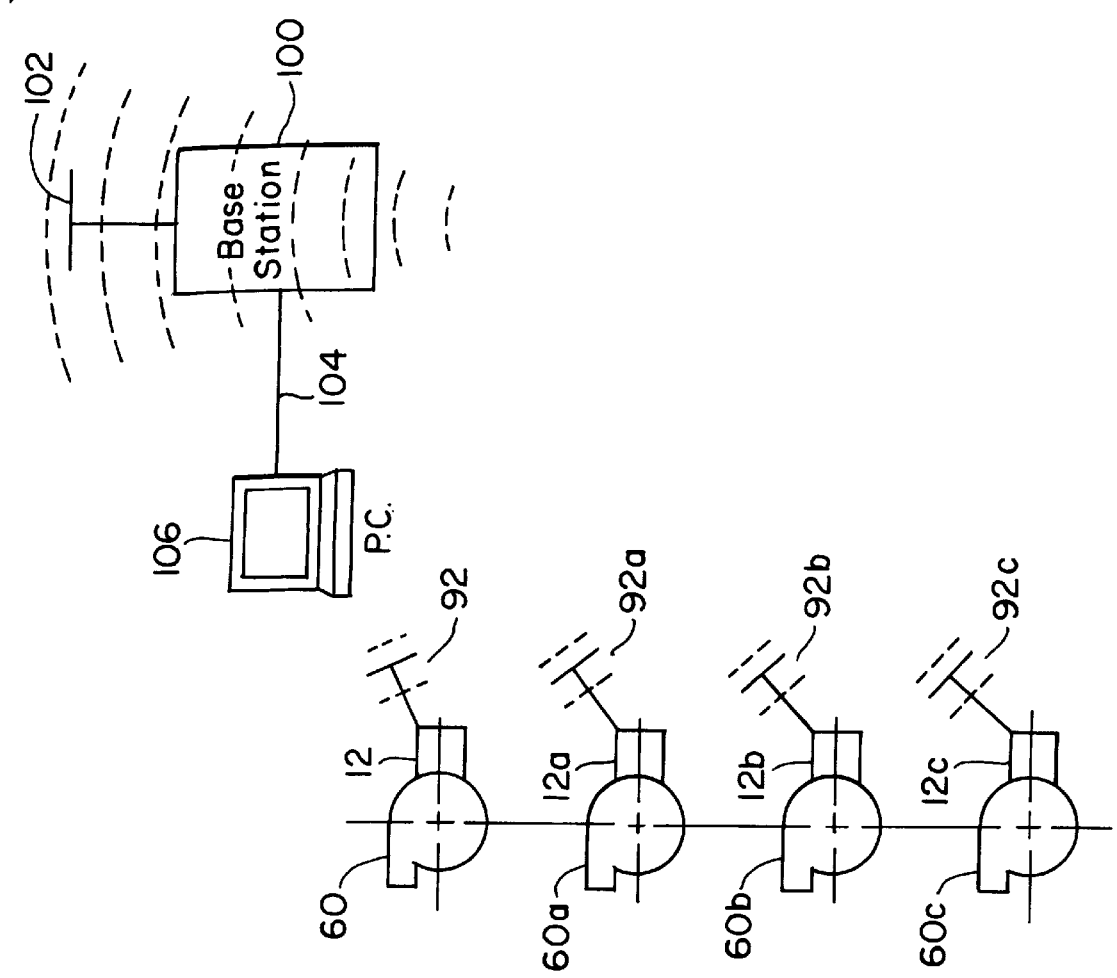

ROTARY SHAFT MONITORING SEAL SYSTEM

FIELD OF INVENTION

This invention relates to a rotary shaft monitoring seal system, and more particularly to such a monitoring seal system which monitors vibration, temperature and/or pressure at the seal location.

BACKGROUND OF INVENTION

Conventional pump monitoring is most often effected by a person who periodically visits each pump, makes observations of noise and leaks and takes vibration readings with instrumentation utilizing an accelerometer. The information is compared with historical data on that pump to detect trends that could result in failure of the pump bearings, couplings or seals. One problem with this procedure is the time and labor costs involved. Another problem is the fact that the pump is not constantly monitored and so flashing (liquid to vapor transition that causes pulsating leakage and chattering of the seal) and cavitation can occur without detection. Yet another problem is the cost of the accelerometers, usually three, required to make the vibration readings. This expense also marshals strongly against the use of a vibration detector mounted on each pump which could monitor constantly. Also marshalling against permanently installed vibration detectors or other detectors such as temperature and pressure detectors is the cost and effort involved in physically monitoring each detector on or near the housing, bearing or coupling and the need to constantly feed back that output to a central station or computer where the information can be viewed and utilized. Further, the wiring for such systems is costly in time, labor and materials. Separately, the detectors used, whether permanently installed or periodically applied by an operator, generally monitor the bearings or couplings, either directly or through the housing and do not indicate the condition of the seal, which often presages failures in other components of the pump. Finally, the installation of such detectors often involves machining or other intrusive operations for the pumps supplied by the manufacturer.

SUMMARY OF INVENTION

It is therefore an object of this invention to provide an improved rotary shaft monitoring seal system.

It is a further object of this invention to provide such a rotating shaft monitoring seal system which automatically installs a monitoring system along with installation of the seal.

It is a further object of this invention to provide such a rotating shaft monitoring seal system which simultaneously seals a shaft and monitors conditions in that vicinity.

It is a further object of this invention to provide such a rotating shaft monitoring seal system which can be permanently installed.

It is a further object of this invention to provide such a rotating shaft monitoring seal system which monitors continuously or periodically.

It is a further object of this invention to provide such a rotating shaft monitoring seal system which is simple to install and operate.

It is a further object of this invention to provide such a rotating shaft monitoring seal system which requires no special installation effort or accommodation.

It is a further object of this invention to provide such a rotating shaft monitoring seal system which is a part of the seal assembly and is installed with the seal assembly.

It is a further object of this invention to provide such a rotating shaft monitoring seal system which senses vibration and temperature and pressure in the vicinity of the seal.

It is a further object of this invention to provide such a rotating shaft monitoring seal system which gives early warning presaging failure of other components.

It is a further object of this invention to provide such a rotating shaft monitoring seal system which eliminates the need for wiring between remote monitoring seal assemblies and a central station.

It is a further object of this invention to provide such a rotating shaft monitoring seal system which is inexpensive, reliable, accurate and convenient.

The invention results from the realization that a truly inexpensive, accurate and simple rotary shaft monitoring seal system can be effected by mounting a detector assembly including one or more temperature, pressure and/or vibration sensors in a port in a seal housing so that the detector assembly is in contact with the seal housing for sensing vibration and the port communicates with the seal assembly for sensing the temperatures/pressures in the vicinity of the seal.

This invention features a rotary shaft monitoring seal system including a seal housing and a seal assembly in the housing for sealingly engaging a rotary shaft to prevent fluid leakage between the shaft and the housing. There is a monitoring port in the housing and a detector assembly mounted in the port for sensing conditions in the vicinity of the seal assembly.

In a preferred embodiment the detector assembly may be in contact with the housing. The detector assembly may include an accelerometer device for sensing vibration in the vicinity of the seal assembly. The port may communicate with the seal assembly. The detector assembly may include a temperature sensor device for sensing the temperature of the fluid in the vicinity of the seal assembly through the port. The detector assembly may include a pressure sensor device for sensing the pressure of the fluid in the vicinity of the seal assembly through the port. The detector assembly may include a communication device for transmitting conditions sensed in the vicinity of the seal assembly. The device may be a wireless communication device. The accelerometer device may include a plurality of accelerometers. There may be three accelerometers aligned in each of three mutually perpendicular axes.

DISCLOSURE OF PREFERRED EMBODIMENT

Other objects, features and advantages will occur to those skilled in the art from the following description of a preferred embodiment and the accompanying drawings, in which:

FIG. 4 is a schematic diagram showing a number of the detector assemblies of FIG. 3 in a wireless communication system with a base station served by a computer.

Figure 1:
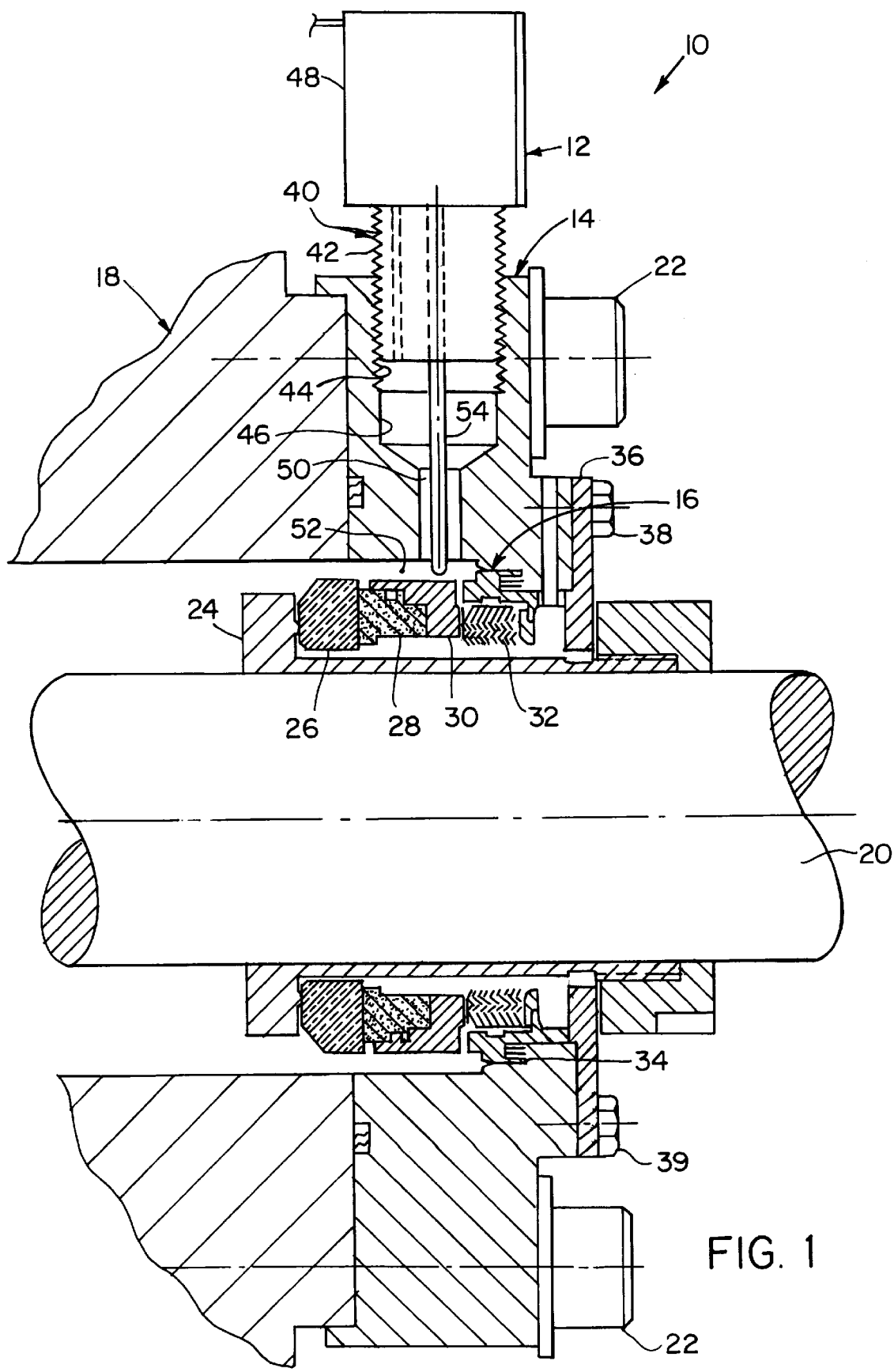
FIG. 1 is a side elevational sectional view of a rotary shaft monitoring seal system according to this invention.

There is shown in FIG. 1 a rotary shaft monitoring seal system 10 according to this invention which includes detector assembly 12, gland plate or seal housing 14 and seal assembly 16 for sealing against fluid flow between machine housing 18 and rotary shaft 20. Seal housing 14 is mounted to machine housing 18 by means of mounting bolts 22. Carried by seal housing 14 is seal assembly 16 which includes metal sleeve 24 fixed to and rotatable with shaft 20, and mating ring 26, typically made of ceramic, fixed to and rotatable with metal sleeve 24 in shaft 20. The remainder of seal assembly 16 is fixed to seal housing 14 and does not rotate with shaft 20. This portion of seal assembly 14 includes a soft, typically carbon, insert 28 which is press-fit into and held by shell 30, attached to which is metal bellows 32; the other end of bellows 32 is attached to adaptor 34, typically made of metal. Shell 30, bellows 32 and adaptor 34 are typically welded together into a single unit. Rear plate 36, held in place by bolts 38 and 39, complete and cover seal assembly 16.

Detector assembly 12 has a lower portion 40 which may be typically threaded at 42 to engage with threads 44 in port 46 of housing 14. Portion 40 is typically in solid contact with housing 14 so that a vibration detector located in upper portion 48 of detector assembly 12 can directly sense the vibrations through housing 14 from shaft 20. Port 46 also may have a hole or passage 50 extending all the way through housing 14 to communicate with the region proximate seal assembly 16 so that, for example, the fluid in area 52 can move up passage 50 into port 46 to be sensed by a pressure sensor in upper portion 48 and temperature probe 54 can extend down to sense the temperature in the vicinity of seal 16. Although the seal assembly in FIG. 1 is shown as a simple one-stage seal, this is not a necessary limitation of the invention as any suitable seal may be used, such as multi-stage seals and more complex seals using barrier fluids. Detector assembly 12 will in any case sense the vibrations coming through seal gland plate or seal housing 14, and the temperature and pressure will be sensed in the vicinity of the seal.

Figure 2:
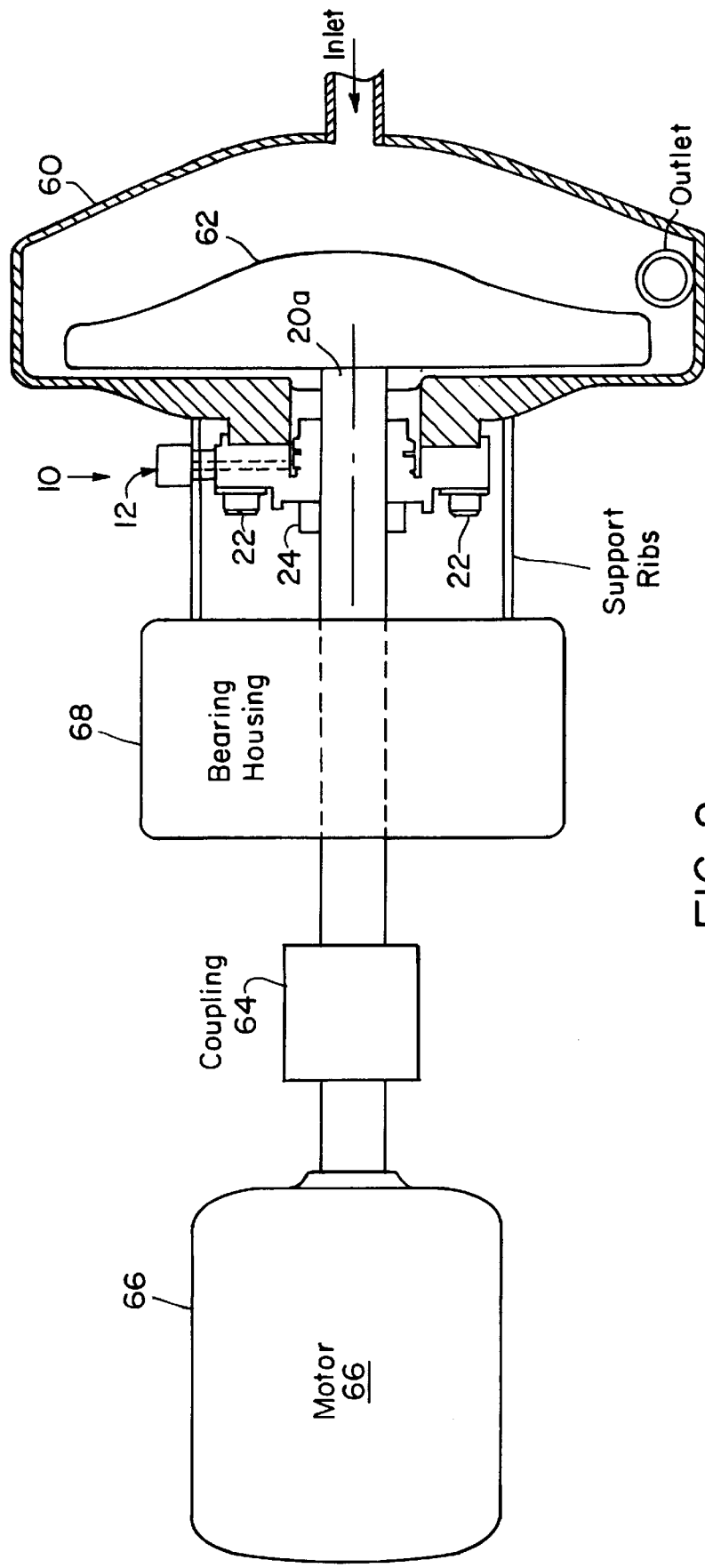
FIG. 2 is a schematic diagram showing the monitoring seal system of FIG. 1 installed between a fluid pump and its drive shaft which is driven by a motor.

Monitoring seal system 10 is typically used with a rotary machine such as pump 60, FIG. 2, whose impeller 62 is mounted on shaft 20a driven through coupling 64 by motor 66. Bearings in bearing housing 68 support shaft 20a. The positioning of the detector assembly in the seal housing, which makes the seal into a monitoring seal system, not only provides easy access to the internal region of the machine where the temperature, pressure and vibration can be meaningfully monitored, it also permits observation of an area, namely the seal, where potential failures can be sensed at the earliest moment. Failure patterns of a bearing or coupling can be sensed by the conditions in the area of the seal assembly even before meaningful indications may be sensible at the bearing housing or coupling.

Figure 3:
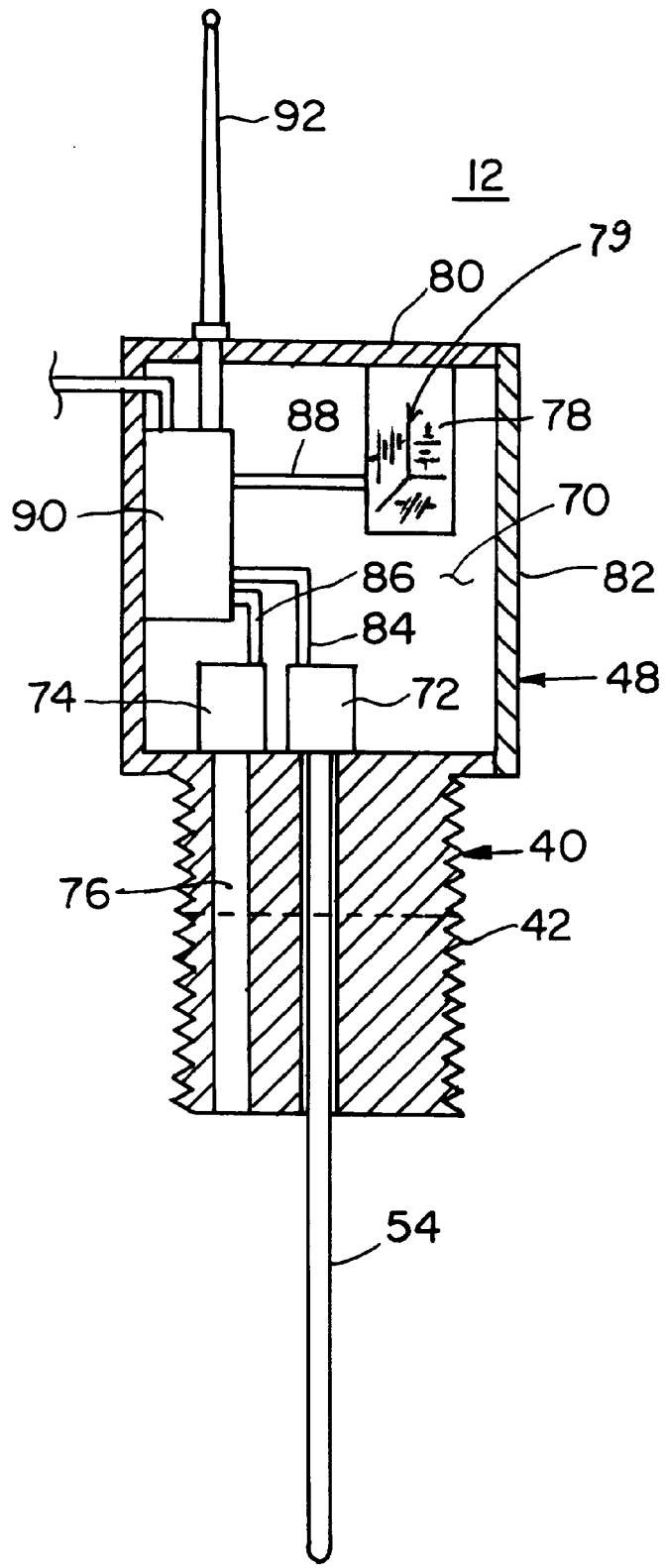
FIG. 3 is a more detailed schematic cross-sectional elevational diagram of the detector assembly of FIG. 1.

Detector assembly 12 may include a chamber 70, FIG. 3, in upper portion 48 which houses a number of sensor components. Temperature sensor 72 connects with temperature probe 54. Pressure transducer 74 has access through passage 76 to port 46 and bore 50 for sensing the pressure in the area of seal 16. Accelerometer device 78 is connected directly to the top wall 80 of upper portion 48 of detector assembly 12 so that it connects directly through upper wall 80, side cylindrical wall 82 and lower portion 48 to seal housing 14 for directly sensing the vibration in the vicinity of seal assembly 16. Temperature sensor 72, pressure transducer 74 and accelerometer device 78 may each be connected through cables 84, 86 and 88, respectively, to a signal conditioning and communications unit 90 which is connected to antenna 92 for transmitting the sensed conditions back to a central station or host computer. Signal conditioning and communications unit 90 may be simply a transmitter which constantly broadcasts its data accompanied by its identifying code, or it may include a receiver and transmitter for communicating via a handshake protocol with a central station or host computer. Signal conditioning and communication unit 90 may include a microprocessor such as a Motorola 688C11F1 microcontroller and a radio transceiver such as a Digital Wireless Corporation WIT2400M transceiver. Pressure transducer 74 may be an EG&G Model 96 or 97 pressure sensor and temperature sensor 72 may be a thermocouple such as an Omega JMTSS-125-U-6. Accelerometer device 78 may be a single accelerometer which senses accelerations in one, two or three mutually perpendicular axes or it may be a triaxial accelerometer such as the EG&G Model 3355 which includes three accelerometers with mutually perpendicular axes. An entire network of detector assemblies 12, 12a, 12b, 12c, FIG. 4, may communicate with one or more base station transceivers 100 each having its own antenna 102 and a cable connection 104 to a central computer 106 such as a PC Model P4D-66 made by Gateway. Thus, the seal and the sensors are integral and require no special installation procedures. The installation of the seal automatically includes the installation of the sensors. Moreover, the sensor seals, once installed, monitor both the condition of the seal and the pump in which the seal is installed simultaneously. Since the condition of the seal is indicative of the condition of the pump and vice versa, the instant invention uniquely monitors both the condition of the seal and the pump without the need for external sensors.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A rotating shaft monitoring seal system comprising:
   a seal housing;
   a seal assembly in said housing for sealingly engaging a rotary shaft to prevent fluid leakage between the shaft and housing;
   a monitoring port in said housing; and
   a detector assembly mounted in said port for sensing conditions in the vicinity of the seal assembly, said detector assembly including at least one probe which extends to a space immediately adjacent said seal assembly and said detector assembly including an accelerometer device for sensing vibration in the vicinity of the seal assembly.

2. The monitoring seal system of claim 1 in which at least a portion of said detector assembly is in contact with said housing.

3. The monitoring seal system of claim 2 in which said detector assembly includes an accelerometer device for sensing, through said seal housing, vibration in the vicinity of the seal assembly.

4. The monitoring seal system of claim 1 in which said port directly communicates with said seal assembly, to provide a passage for said detector assembly probe.

5. The monitoring seal system of claim 4 in which said detector assembly includes a temperature sensor device for sensing the temperature of the fluid in the vicinity of said seal assembly through said port, and said temperature sensor device includes at least one portion disposed within said detector assembly probe.

6. The monitoring seal system of claim 4 in which said monitoring port provides clearance to said detector assembly probe so as to permit fluid communication between said detector assembly and said space immediately adjacent said seal assembly, and said detector assembly further includes a pressure sensor device for sensing the pressure of the fluid in the vicinity of said seal assembly through said port.

7. The monitoring seal system of claim 1 in which said detector assembly includes a communication device for transmitting data indicative of sensed conditions in the vicinity of the seal assembly.

8. The monitoring seal system of claim 1 in which said accelerometer device includes a plurality of accelerometers.

9. The monitoring seal system of claim 8 in which said accelerometer device includes an accelerometer aligned in each of three mutually perpendicular axes.

10. The monitoring seal system of claim 7 in which said communication device includes wireless communication means.

11. A rotating shaft monitoring seal system comprising:
   a seal housing;
   a seal assembly in said housing for sealingly engaging a rotary shaft to prevent fluid leakage between the shaft and housing;
   a monitoring port in said housing; and
   a detector assembly mounted in said port for sensing data indicative of conditions in the vicinity of the seal assembly, said detector assembly comprising at least two detecting devices selected from the group consisting of a temperature sensor device, a pressure sensor and an accelerometer.

12. The monitoring seal system of claim 11 wherein said at least two subassemblies comprise in combination a temperature sensor device and an accelerometer.

13. The monitoring seal system of claim 12 wherein said at least two subassemblies comprise a pressure sensor.

14. The monitoring seal of claim 13 in which said detector assembly includes a communication device for transmitting data indicative of sensed conditions in the vicinity of the seal assembly and a microprocessor for receiving and analyzing the sensed data from said at least two detecting devices.

15. The monitoring seal system of claim 11 wherein said at least two subassemblies comprise in combination a temperature sensor device and a pressure sensor.

16. The monitoring seal system of claim 11 wherein said at least two subassemblies comprise in combination a pressure sensor and an accelerometer.

17. The monitoring seal of claim 11 in which said detector assembly includes a communication device for transmitting data indicative of sensed conditions in the vicinity of the seal assembly and a microprocessor for receiving and analyzing the sensed data from said at least two subassemblies.

* * * * *